(12) United States Patent
Ferraiolo et al.

(10) Patent No.: US 7,934,115 B2
(45) Date of Patent: *Apr. 26, 2011

(54) DERIVING CLOCKS IN A MEMORY SYSTEM

(75) Inventors: Frank D. Ferraiolo, New Windsor, NY (US); Kevn C. Gower, LaGrangeville, NY (US); Martin L. Schmatz, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 309 days.

This patent is subject to a terminal disclaimer.

(21) Appl. No.: 12/332,396

(22) Filed: Dec. 11, 2008

(65) Prior Publication Data

US 2009/0094476 A1    Apr. 9, 2009

Related U.S. Application Data

(63) Continuation of application No. 11/263,344, filed on Oct. 31, 2005, now Pat. No. 7,478,259.

(51) Int. Cl.
*G06F 1/00* (2006.01)
(52) U.S. Cl. ......................... 713/501; 713/500
(58) Field of Classification Search ........... 713/500–501
See application file for complete search history.

(56) References Cited

U.S. PATENT DOCUMENTS

| | | | |
|---|---|---|---|
| 2,842,682 A | 7/1958 | Clapper | |
| 3,333,253 A | 7/1967 | Sahulka | |
| 3,395,400 A | 7/1968 | De Witt et al. | |
| 3,825,904 A | 7/1974 | Burk et al. | 340/172.5 |
| 4,028,675 A | 6/1977 | Frankenberg | 711/106 |
| 4,135,240 A | 1/1979 | Ritchie | |
| 4,150,428 A | 4/1979 | Inrig et al. | |
| 4,472,780 A | 9/1984 | Chenoweth et al. | |
| 4,475,194 A | 10/1984 | LaVallee et al. | 371/10 |
| 4,479,214 A | 10/1984 | Ryan | |
| 4,486,739 A | 12/1984 | Franaszek et al. | 340/347 |
| 4,641,263 A | 2/1987 | Perlman et al. | |
| 4,654,857 A | 3/1987 | Samson et al. | 371/68 |
| 4,723,120 A | 2/1988 | Petty, Jr. | 340/825.02 |

(Continued)

FOREIGN PATENT DOCUMENTS

EP     0229316     7/1987

(Continued)

OTHER PUBLICATIONS

IBM. IBM WebSphere Enterprise Service Bus. Version 6.0.2 2006 (165-0071-USC NOA Jun. 12, 2009).

(Continued)

*Primary Examiner* — Paul R Myers
(74) *Attorney, Agent, or Firm* — Cantor Colburn LLP

(57) ABSTRACT

A computer program product and a hub device for deriving clocks in a memory system are provided. The computer program product includes a storage medium readable by a processing circuit and storing instructions for execution by the processing circuit for facilitating a method. The method includes receiving a reference oscillator clock at the hub device. The hub device is in communication with a controller channel via a controller interface and in communication with a memory device via a memory interface. A base clock operating at a base clock frequency is derived from the reference oscillator clock. A memory interface clock is derived by multiplying the base clock by a memory multiplier. A controller interface clock is derived by multiplying the base clock by a controller multiplier. The memory interface clock is applied to the memory interface and the controller interface clock is applied to the controller interface.

18 Claims, 5 Drawing Sheets

U.S. PATENT DOCUMENTS

| | | | |
|---|---|---|---|
| 4,740,916 A | 4/1988 | Martin | 364/900 |
| 4,782,487 A | 11/1988 | Smelser | |
| 4,796,231 A | 1/1989 | Pinkham | 365/189.05 |
| 4,803,485 A | 2/1989 | Rypinski | 370/452 |
| 4,833,605 A | 5/1989 | Terada et al. | 364/200 |
| 4,839,534 A | 6/1989 | Clasen | 307/269 |
| 4,943,984 A | 7/1990 | Pechanek et al. | 375/109 |
| 4,964,129 A | 10/1990 | Bowden, III et al. | |
| 4,964,130 A | 10/1990 | Bowden, III et al. | |
| 4,985,828 A | 1/1991 | Shimizu et al. | 364/200 |
| 5,053,947 A | 10/1991 | Heibel et al. | 364/200 |
| 5,177,375 A | 1/1993 | Ogawa et al. | |
| 5,206,946 A | 4/1993 | Brunk | 710/2 |
| 5,214,747 A | 5/1993 | Cok | 395/27 |
| 5,265,212 A | 11/1993 | Bruce, II | 710/113 |
| 5,287,531 A | 2/1994 | Rogers, Jr. et al. | 395/800 |
| 5,347,270 A | 9/1994 | Matsuda et al. | 340/2.21 |
| 5,357,621 A | 10/1994 | Cox | 711/172 |
| 5,375,127 A | 12/1994 | Leak et al. | |
| 5,387,911 A | 2/1995 | Gleichert et al. | 341/95 |
| 5,394,535 A | 2/1995 | Ohuchi | 711/155 |
| 5,410,545 A | 4/1995 | Porter et al. | |
| 5,454,091 A | 9/1995 | Sites et al. | 395/413 |
| 5,475,690 A | 12/1995 | Burns et al. | 370/105.3 |
| 5,513,135 A | 4/1996 | Dell et al. | 365/52 |
| 5,517,626 A | 5/1996 | Archer et al. | 395/290 |
| 5,522,064 A | 5/1996 | Aldereguia et al. | |
| 5,537,621 A | 7/1996 | Charlot et al. | |
| 5,544,309 A | 8/1996 | Chang et al. | 395/183.06 |
| 5,546,023 A | 8/1996 | Borkar et al. | |
| 5,561,826 A | 10/1996 | Davies et al. | |
| 5,592,632 A | 1/1997 | Leung et al. | 395/306 |
| 5,594,925 A | 1/1997 | Harder et al. | 395/863 |
| 5,611,055 A | 3/1997 | Krishan et al. | 395/281 |
| 5,613,077 A | 3/1997 | Leung et al. | 395/306 |
| 5,627,963 A | 5/1997 | Gabillard et al. | 714/42 |
| 5,629,685 A | 5/1997 | Allen et al. | 340/825.02 |
| 5,661,677 A | 8/1997 | Rondeau, II et al. | 365/63 |
| 5,666,480 A | 9/1997 | Leung et al. | 395/180 |
| 5,684,418 A | 11/1997 | Yanagiuchi | |
| 5,706,346 A | 1/1998 | Katta et al. | 380/10 |
| 5,737,589 A | 4/1998 | Doi et al. | |
| 5,754,804 A | 5/1998 | Cheselka et al. | |
| 5,764,155 A | 6/1998 | Kertesz et al. | 340/825.08 |
| 5,822,749 A | 10/1998 | Agarwal | 707/2 |
| 5,852,617 A | 12/1998 | Mote, Jr. | 714/726 |
| 5,870,320 A | 2/1999 | Volkonsky | |
| 5,870,325 A | 2/1999 | Nielsen et al. | 365/63 |
| 5,872,996 A | 2/1999 | Barth et al. | 395/853 |
| 5,881,154 A | 3/1999 | Nohara et al. | |
| 5,917,760 A | 6/1999 | Millar | |
| 5,917,780 A | 6/1999 | Berestov | |
| 5,926,838 A | 7/1999 | Jeddeloh | 711/167 |
| 5,928,343 A | 7/1999 | Farmwald et al. | 710/104 |
| 5,930,273 A | 7/1999 | Mukojima | 714/776 |
| 5,959,914 A | 9/1999 | Gates et al. | 365/201 |
| 5,973,951 A | 10/1999 | Bechtolsheim et al. | 365/52 |
| 5,974,493 A | 10/1999 | Okumura et al. | 710/307 |
| 5,995,405 A | 11/1999 | Trick | 365/63 |
| 6,003,121 A | 12/1999 | Wirt | |
| 6,011,732 A | 1/2000 | Harrison et al. | 365/194 |
| 6,038,132 A | 3/2000 | Tokunaga et al. | 361/760 |
| 6,049,476 A | 4/2000 | Laudon et al. | 365/52 |
| 6,076,158 A | 6/2000 | Sites et al. | 712/230 |
| 6,078,515 A | 6/2000 | Nielsen et al. | 365/63 |
| 6,081,868 A | 6/2000 | Brooks | |
| 6,085,276 A | 7/2000 | VanDoren et al. | |
| 6,088,817 A | 7/2000 | Haulin | |
| 6,096,091 A | 8/2000 | Hartmann | 716/17 |
| 6,128,746 A | 10/2000 | Clark et al. | 713/324 |
| 6,145,028 A | 11/2000 | Shank et al. | 710/31 |
| 6,158,040 A | 12/2000 | Ho | |
| 6,170,047 B1 | 1/2001 | Dye | 711/170 |
| 6,170,059 B1 | 1/2001 | Pruett et al. | 713/200 |
| 6,173,382 B1 | 1/2001 | Dell et al. | 711/170 |
| 6,185,718 B1 | 2/2001 | Dell et al. | |
| 6,198,304 B1 | 3/2001 | Sasaki | |
| 6,215,686 B1 | 4/2001 | Deneroff et al. | 365/52 |
| 6,216,247 B1 | 4/2001 | Creta et al. | |
| 6,219,288 B1 | 4/2001 | Braceras et al. | |
| 6,219,760 B1 | 4/2001 | McMinn | |
| 6,233,639 B1 | 5/2001 | Dell et al. | |
| 6,260,127 B1 | 7/2001 | Olarig et al. | 711/167 |
| 6,262,493 B1 | 7/2001 | Garnett | |
| 6,285,172 B1 | 9/2001 | Torbey | |
| 6,292,903 B1 | 9/2001 | Coteus et al. | 713/401 |
| 6,301,636 B1 | 10/2001 | Schultz et al. | 711/108 |
| 6,308,247 B1 | 10/2001 | Ackerman et al. | |
| 6,317,352 B1 | 11/2001 | Halbert et al. | 365/52 |
| 6,321,343 B1 | 11/2001 | Toda | 713/600 |
| 6,338,113 B1 | 1/2002 | Kubo et al. | 711/105 |
| 6,349,390 B1 | 2/2002 | Dell et al. | |
| 6,357,018 B1 | 3/2002 | Stuewe et al. | |
| 6,370,631 B1 | 4/2002 | Dye | 711/170 |
| 6,378,018 B1 | 4/2002 | Tsern et al. | 710/129 |
| 6,381,685 B2 | 4/2002 | Dell et al. | |
| 6,393,512 B1 | 5/2002 | Chen et al. | |
| 6,393,528 B1 | 5/2002 | Arimilli et al. | 711/137 |
| 6,408,398 B1 | 6/2002 | Freker et al. | |
| 6,425,044 B1 | 7/2002 | Jeddeloh | |
| 6,442,698 B2 | 8/2002 | Nizar | |
| 6,446,174 B1 | 9/2002 | Dow | |
| 6,446,224 B1 | 9/2002 | Chang et al. | |
| 6,467,013 B1 | 10/2002 | Nizar | |
| 6,473,836 B1 | 10/2002 | Ikeda | 711/137 |
| 6,477,614 B1 | 11/2002 | Leddige et al. | |
| 6,477,615 B1 | 11/2002 | Tanaka | |
| 6,483,755 B2 | 11/2002 | Leung et al. | 365/189.05 |
| 6,484,271 B1 | 11/2002 | Gray | |
| 6,487,102 B1 | 11/2002 | Halbert et al. | |
| 6,487,627 B1 | 11/2002 | Willke et al. | 710/306 |
| 6,493,250 B2 | 12/2002 | Halbert et al. | 365/63 |
| 6,496,540 B1 | 12/2002 | Widmer | 375/242 |
| 6,496,910 B1 | 12/2002 | Baentsch et al. | 711/165 |
| 6,499,070 B1 | 12/2002 | Whetsel | 710/71 |
| 6,502,161 B1 | 12/2002 | Perego et al. | 711/5 |
| 6,505,305 B1 | 1/2003 | Olarig | |
| 6,507,888 B2 | 1/2003 | Wu et al. | 711/105 |
| 6,510,100 B2 | 1/2003 | Grundon et al. | 365/233 |
| 6,513,091 B1 | 1/2003 | Blackmon et al. | 710/316 |
| 6,526,469 B1 | 2/2003 | Drehmel et al. | 710/306 |
| 6,530,007 B2 | 3/2003 | Olarig et al. | |
| 6,532,525 B1 | 3/2003 | Aleksic et al. | 711/168 |
| 6,546,359 B1 | 4/2003 | Week | 702/186 |
| 6,549,971 B1 | 4/2003 | Cecchi et al. | 710/306 |
| 6,553,450 B1 | 4/2003 | Dodd et al. | 711/105 |
| 6,557,069 B1 | 4/2003 | Drehmel et al. | 710/307 |
| 6,564,329 B1 | 5/2003 | Cheung et al. | 713/322 |
| 6,584,576 B1 | 6/2003 | Co | 713/401 |
| 6,587,912 B2 | 7/2003 | Leddige et al. | |
| 6,590,827 B2 | 7/2003 | Chang et al. | |
| 6,594,713 B1 | 7/2003 | Fuocco et al. | |
| 6,594,748 B1 | 7/2003 | Lin | |
| 6,601,121 B2 | 7/2003 | Singh et al. | 710/112 |
| 6,601,149 B1 | 7/2003 | Brock et al. | |
| 6,604,180 B2 | 8/2003 | Jeddeloh | 711/169 |
| 6,611,902 B2 | 8/2003 | Kuroda et al. | |
| 6,611,905 B1 | 8/2003 | Grundon et al. | 711/167 |
| 6,622,217 B2 | 9/2003 | Gharacorloo et al. | 711/141 |
| 6,622,227 B2 | 9/2003 | Zumkehr et al. | |
| 6,625,687 B1 | 9/2003 | Halber et al. | 711/105 |
| 6,625,702 B2 | 9/2003 | Rentschler et al. | |
| 6,628,538 B2 | 9/2003 | Funaba et al. | 365/63 |
| 6,631,439 B2 | 10/2003 | Saulsbury et al. | |
| 6,636,957 B2 | 10/2003 | Stevens et al. | |
| 6,643,745 B1 | 11/2003 | Palanca et al. | |
| 6,671,376 B1 | 12/2003 | Koto et al. | 380/210 |
| 6,675,280 B2 | 1/2004 | Cooksey et al. | |
| 6,678,777 B2 | 1/2004 | Rao et al. | |
| 6,678,811 B2 | 1/2004 | Rentscler et al. | 711/167 |
| 6,681,292 B2 | 1/2004 | Creta et al. | |
| 6,684,320 B2 | 1/2004 | Mohamed et al. | |
| 6,697,919 B2 | 2/2004 | Gharacorloo et al. | 711/141 |
| 6,704,842 B1 | 3/2004 | Janakiraman et al. | |
| 6,721,185 B2 | 4/2004 | Dong et al. | |
| 6,721,944 B2 | 4/2004 | Chaudhry et al. | |
| 6,735,669 B2 | 5/2004 | Shin | |

| Patent No. | Date | Name | Ref |
|---|---|---|---|
| 6,738,836 B1 | 5/2004 | Kessler et al. | |
| 6,741,096 B2 | 5/2004 | Moss | |
| 6,748,518 B1 | 6/2004 | Guthrie et al. | |
| 6,754,762 B1 | 6/2004 | Curley | 710/316 |
| 6,760,817 B2 | 7/2004 | Arimilli et al. | |
| 6,766,389 B2 | 7/2004 | Hayter et al. | |
| 6,775,747 B2 | 8/2004 | Venkatraman | |
| 6,779,075 B2 | 8/2004 | Wu et al. | 711/105 |
| 6,791,555 B1 | 9/2004 | Radke et al. | |
| 6,792,495 B1 | 9/2004 | Garney et al. | |
| 6,799,241 B2 | 9/2004 | Kahn et al. | |
| 6,807,650 B2 | 10/2004 | Lamb et al. | 716/1 |
| 6,832,286 B2 | 12/2004 | Johnson et al. | 711/105 |
| 6,832,329 B2 | 12/2004 | Ahrens et al. | |
| 6,834,355 B2 | 12/2004 | Uzelac | 713/300 |
| 6,839,393 B1 | 1/2005 | Sidiropoulos | 375/371 |
| 6,845,472 B2 | 1/2005 | Walker et al. | |
| 6,847,583 B2 | 1/2005 | Janzen et al. | |
| 6,851,036 B1 | 2/2005 | Toda et al. | |
| 6,854,043 B2 | 2/2005 | Hargis et al. | 711/168 |
| 6,865,646 B2 | 3/2005 | David | 711/128 |
| 6,871,253 B2 | 3/2005 | Greeff et al. | 710/316 |
| 6,874,102 B2 | 3/2005 | Doody et al. | 714/5 |
| 6,877,076 B1 | 4/2005 | Cho et al. | |
| 6,877,078 B2 | 4/2005 | Fujiwara et al. | |
| 6,882,082 B2 | 4/2005 | Greeff et al. | |
| 6,889,284 B1 | 5/2005 | Nizar et al. | |
| 6,898,726 B1 | 5/2005 | Lee | 713/503 |
| 6,910,146 B2 | 6/2005 | Dow | |
| 6,918,068 B2 | 7/2005 | Vail et al. | 714/56 |
| 6,922,658 B2 | 7/2005 | Bohizic et al. | |
| 6,925,534 B2 | 8/2005 | David | |
| 6,938,119 B2 | 8/2005 | Kohn et al. | |
| 6,944,084 B2 | 9/2005 | Wilcox | |
| 6,948,091 B2 | 9/2005 | Bartels et al. | 714/11 |
| 6,949,950 B2 | 9/2005 | Takahashi et al. | |
| 6,952,761 B2 | 10/2005 | John | |
| 6,965,952 B2 | 11/2005 | Echartea et al. | |
| 6,977,536 B2 | 12/2005 | Chin-Chieh et al. | 327/116 |
| 6,977,979 B1 | 12/2005 | Hartwell et al. | |
| 6,993,612 B2 | 1/2006 | Porterfield | |
| 6,996,639 B2 | 2/2006 | Narad | |
| 6,996,766 B2 | 2/2006 | Cypher | |
| 7,017,020 B2 | 3/2006 | Herbst et al. | |
| 7,024,518 B2 | 4/2006 | Halbert et al. | 711/115 |
| 7,027,336 B2 | 4/2006 | Lee | |
| 7,039,755 B1 | 5/2006 | Helms | |
| 7,047,370 B1 | 5/2006 | Jeter, Jr. et al. | |
| 7,047,371 B2 | 5/2006 | Dortu | |
| 7,047,373 B2 | 5/2006 | Kim | |
| 7,047,384 B2 | 5/2006 | Bodas et al. | 711/167 |
| 7,051,172 B2 | 5/2006 | Mastronarde et al. | 711/158 |
| 7,073,010 B2 | 7/2006 | Chen et al. | 710/313 |
| 7,076,700 B2 | 7/2006 | Rieger | |
| 7,091,890 B1 | 8/2006 | Sasaki et al. | |
| 7,093,078 B2 | 8/2006 | Kondo | 711/141 |
| 7,096,407 B2 | 8/2006 | Olarig | 714/768 |
| 7,103,792 B2 | 9/2006 | Moon | 713/500 |
| 7,113,418 B2 | 9/2006 | Oberlin et al. | 365/63 |
| 7,114,109 B2 | 9/2006 | Daily et al. | 714/724 |
| 7,120,743 B2 | 10/2006 | Meyer et al. | |
| 7,127,629 B2 | 10/2006 | Vogt | 713/500 |
| 7,133,790 B2 | 11/2006 | Liou | |
| 7,133,972 B2 | 11/2006 | Jeddeloh | |
| 7,136,958 B2 | 11/2006 | Jeddeloh | 710/317 |
| 7,155,016 B1 | 12/2006 | Betts et al. | |
| 7,155,623 B2 | 12/2006 | Lefurgy et al. | 713/300 |
| 7,162,567 B2 | 1/2007 | Jeddeloh | 711/154 |
| 7,165,153 B2 | 1/2007 | Vogt | 711/154 |
| 7,177,211 B2 | 2/2007 | Zimmerman | 365/201 |
| 7,181,584 B2 | 2/2007 | LaBerge | 711/167 |
| 7,194,593 B2 | 3/2007 | Schnepper | 711/154 |
| 7,197,594 B2 | 3/2007 | Raz et al. | 711/103 |
| 7,197,670 B2 | 3/2007 | Boatright et al. | |
| 7,200,832 B2 | 4/2007 | Butt et al. | 710/17 |
| 7,203,318 B2 | 4/2007 | Collum et al. | |
| 7,206,887 B2 | 4/2007 | Jeddeloh | |
| 7,206,962 B2 | 4/2007 | Deegan | |
| 7,210,059 B2 | 4/2007 | Jeddeloh | |
| 7,216,196 B2 | 5/2007 | Jeddeloh | |
| 7,216,276 B1 | 5/2007 | Azimi et al. | |
| 7,222,213 B2 | 5/2007 | James | |
| 7,227,949 B2 | 6/2007 | Heegard et al. | 380/37 |
| 7,234,099 B2 | 6/2007 | Gower et al. | 714/767 |
| 7,240,145 B2 | 7/2007 | Holman | 711/5 |
| 7,260,685 B2 | 8/2007 | Lee et al. | 711/213 |
| 7,266,634 B2 | 9/2007 | Ware et al. | |
| 7,269,765 B1 | 9/2007 | Charlton et al. | |
| 7,290,190 B2 | 10/2007 | Obara | 714/729 |
| 7,296,129 B2 | 11/2007 | Gower et al. | |
| 7,304,905 B2 | 12/2007 | Hsu et al. | 365/226 |
| 7,313,583 B2 | 12/2007 | Porten et al. | 708/492 |
| 7,319,340 B2 | 1/2008 | Jeddeloh et al. | |
| 7,321,979 B2 | 1/2008 | Lee | |
| 7,331,010 B2 | 2/2008 | Dell et al. | |
| 7,334,070 B2 | 2/2008 | Borkenhagen | |
| 7,334,159 B1 | 2/2008 | Callaghan | |
| 7,353,316 B2 | 4/2008 | Erdmann | |
| 7,360,027 B2 | 4/2008 | Huggahalli et al. | |
| 7,363,419 B2 | 4/2008 | Cronin et al. | |
| 7,363,436 B1 | 4/2008 | Yeh et al. | |
| 7,370,134 B2 | 5/2008 | Jeddeloh | |
| 7,373,440 B2 | 5/2008 | Huppenthal et al. | 712/15 |
| 7,376,146 B2 | 5/2008 | Beverly et al. | |
| 7,386,575 B2 | 6/2008 | Bashant et al. | |
| 7,386,696 B2 | 6/2008 | Jakobs et al. | |
| 7,386,771 B2 | 6/2008 | Shuma | |
| 7,404,118 B1 | 7/2008 | Baguette et al. | |
| 7,412,566 B2 | 8/2008 | Lee et al. | |
| 7,412,574 B2 | 8/2008 | Jeddeloh | |
| 7,418,526 B2 | 8/2008 | Jeddeloh | |
| 7,421,525 B2 | 9/2008 | Polzin et al. | |
| 7,430,145 B2 | 9/2008 | Weiss et al. | |
| 7,433,258 B2 | 10/2008 | Rao et al. | |
| 2001/0029592 A1 | 10/2001 | Walker et al. | |
| 2002/0059439 A1 | 5/2002 | Arroyo et al. | |
| 2002/0103988 A1 | 8/2002 | Dornier | 712/38 |
| 2002/0124201 A1 | 9/2002 | Edwards et al. | |
| 2003/0033364 A1 | 2/2003 | Garnett et al. | 709/203 |
| 2003/0051055 A1 | 3/2003 | Parrella et al. | |
| 2003/0056183 A1 | 3/2003 | Kobayashi | |
| 2003/0084309 A1 | 5/2003 | Kohn | 713/189 |
| 2003/0090879 A1 | 5/2003 | Doblar et al. | |
| 2003/0118044 A1 | 6/2003 | Blanc et al. | |
| 2003/0126354 A1 | 7/2003 | Kahn et al. | |
| 2003/0229770 A1 | 12/2003 | Jeddeloh | |
| 2003/0235222 A1 | 12/2003 | Bridges et al. | |
| 2004/0015650 A1 | 1/2004 | Zumkehr et al. | |
| 2004/0078615 A1 | 4/2004 | Martin et al. | |
| 2004/0098546 A1 | 5/2004 | Bashant et al. | |
| 2004/0098549 A1 | 5/2004 | Dorst | |
| 2004/0117588 A1 | 6/2004 | Arimilli et al. | 711/203 |
| 2004/0123222 A1 | 6/2004 | Widmer | |
| 2004/0128474 A1 | 7/2004 | Vorbach | 712/10 |
| 2004/0148482 A1 | 7/2004 | Grundy et al. | |
| 2004/0160832 A1 | 8/2004 | Janzen et al. | |
| 2004/0230718 A1 | 11/2004 | Polzin et al. | 710/22 |
| 2004/0260957 A1 | 12/2004 | Jeddeloh et al. | 713/300 |
| 2005/0022065 A1 | 1/2005 | Dixon et al. | |
| 2005/0023560 A1 | 2/2005 | Ahn et al. | 257/200 |
| 2005/0027941 A1 | 2/2005 | Wang et al. | |
| 2005/0044305 A1 | 2/2005 | Jakobs et al. | |
| 2005/0050237 A1 | 3/2005 | Jeddeloh et al. | 710/10 |
| 2005/0071542 A1 | 3/2005 | Weber et al. | |
| 2005/0071707 A1 | 3/2005 | Hampel | |
| 2005/0078506 A1 | 4/2005 | Rao et al. | |
| 2005/0080581 A1 | 4/2005 | Zimmerman et al. | 702/117 |
| 2005/0081085 A1 | 4/2005 | Ellis et al. | |
| 2005/0081114 A1 | 4/2005 | Ackaret et al. | |
| 2005/0081129 A1 | 4/2005 | Shah et al. | |
| 2005/0086424 A1 | 4/2005 | Oh et al. | |
| 2005/0105350 A1 | 5/2005 | Zimmerman et al. | |
| 2005/0125702 A1 | 6/2005 | Huang et al. | 713/320 |
| 2005/0138246 A1 | 6/2005 | Chen et al. | |
| 2005/0138267 A1 | 6/2005 | Bains et al. | 711/100 |
| 2005/0144399 A1 | 6/2005 | Hosomi | 711/145 |
| 2005/0149665 A1 | 7/2005 | Wolrich et al. | |
| 2005/0166006 A1 | 7/2005 | Talbot et al. | |

| | | | |
|---|---|---|---|
| 2005/0216678 A1 | 9/2005 | Jeddeloh | |
| 2005/0220097 A1 | 10/2005 | Swami et al. | |
| 2005/0223196 A1 | 10/2005 | Knowles | |
| 2005/0289292 A1 | 12/2005 | Morrow et al. | |
| 2005/0289377 A1 | 12/2005 | Luong et al. | |
| 2006/0004953 A1 | 1/2006 | Vogt | |
| 2006/0010339 A1 | 1/2006 | Klein | |
| 2006/0036826 A1 | 2/2006 | Dell et al. | |
| 2006/0036827 A1 | 2/2006 | Dell et al. | |
| 2006/0080584 A1 | 4/2006 | Hartnett et al. | |
| 2006/0095679 A1 | 5/2006 | Edirisooriya | |
| 2006/0104371 A1 | 5/2006 | Schuermans et al. | |
| 2006/0112238 A1 | 5/2006 | Jamil et al. | 711/145 |
| 2006/0161733 A1 | 7/2006 | Beckett et al. | |
| 2006/0162882 A1 | 7/2006 | Ohara et al. | |
| 2006/0168407 A1 | 7/2006 | Stern | |
| 2006/0179208 A1 | 8/2006 | Jeddeloh | |
| 2006/0190674 A1 | 8/2006 | Poechmueller | |
| 2006/0195631 A1 | 8/2006 | Rajamani | |
| 2006/0206742 A1 | 9/2006 | James | |
| 2006/0212666 A1 | 9/2006 | Jeddeloh | |
| 2006/0224764 A1 | 10/2006 | Shinohara et al. | |
| 2006/0277365 A1 | 12/2006 | Pong | |
| 2006/0288172 A1 | 12/2006 | Lee et al. | |
| 2007/0005922 A1 | 1/2007 | Swaminathan et al. | |
| 2007/0025304 A1 | 2/2007 | Leelahakriengkrai et al. | |
| 2007/0038907 A1 | 2/2007 | Jeddeloh et al. | |
| 2007/0067382 A1 | 3/2007 | Sun | |
| 2007/0083701 A1 | 4/2007 | Kapil | |
| 2007/0160053 A1 | 7/2007 | Coteus et al. | |
| 2008/0043808 A1 | 2/2008 | Hsu et al. | |
| 2008/0162807 A1 | 7/2008 | Rothman et al. | |
| 2008/0163014 A1 | 7/2008 | Crawford et al. | |
| 2008/0222379 A1 | 9/2008 | Jeddeloh | |
| 2009/0006900 A1 | 1/2009 | Lastras-Montano et al. | |

FOREIGN PATENT DOCUMENTS

| | | |
|---|---|---|
| EP | 0470734 A1 | 2/1992 |
| EP | 0899743 A2 | 6/1998 |
| EP | 1429340 | 6/2004 |
| GB | 2396711 A | 6/2004 |
| JP | 59153353 | 9/1984 |
| JP | 01144140 A | 6/1989 |
| JP | 0432614 | 11/1992 |
| JP | 10011971 | 1/1998 |
| JP | 2004139552 A | 5/2004 |
| JP | 20083711 A | 1/2008 |
| WO | WO 9621188 | 7/1996 |
| WO | WO98/12651 | 3/1998 |
| WO | 00/04481 A | 1/2000 |
| WO | WO02/23353 | 3/2002 |
| WO | 2005/038660 A | 4/2005 |
| WO | WO2007109888 A1 | 10/2007 |

OTHER PUBLICATIONS

BEA Systems Inc. Integration of Clustered BEA AquaLogic Service Bus Domain and Remote Tibco Enterprise Message Service 4.2.0 for Messaging Application in SOA. BEA White Paper. 2006 (165-0071-USC NOA Jun. 12, 2009).

Oracle. Oracle Enterprise Service Bus. Oracle Data Sheet. Oct. 2006 (165-0071-USC NOA Jun. 12, 2009).

Boudon, et al., "Novel Bus Reconfiguration Scheme With Spare Lines", IBM Technical Disclosure Bulletin, May 1987, vol. 29, No. 12, pp. 1-3.

Rosenberg, "Dictionary of Computers, Information Processing & Telecommuications", Second Edition, John Wiley & Sons, Inc. 1987. 3 pgs.

Singh. S., et al., "Bus Sparing for Fault-Tolerant System Design", IBM Technical Disclosure Bulletin, Dec. 1991, vol. 34, No. 71, pp. 117-118.

NB940259 (IBM Technical Disclosure Bulletin, Feb. 1994; vol. 37; pp. 59-64).

Nilsen, "High-Level Dynamic Memory Management for Object-Oriented Real-Time Systems", Jan. 1, 1996, pp. 86-93.

Massoud Pedram, "Power Minimization in IC Design Principles and Applications", ACM Transactions on Design Automation of Electronic Systems vol. 1, No. 1, Jan. 1996, pp. 3-56.

Jungjoon Kim et al.; "Performance and Architecture Features of Segmented Multiple Bus System;" IEEE Computer Society; Sep. 21-24, 1999 International Conference on Parallel Processing (ICPP '99).

Benini, et al., "System-Level Powers Optimization: Techniques and Tools", ACM Transactions on Design Automation of Electronic Systems, vol. 5, No. 2, Apr. 2000, pp. 115-192.

P.R. Panda, "Data and Memory Optimization Techniques for Embedded Systems", ACM Transactions on Design Automation of Electronic Systems, vol. 6, No. 2, Apr. 2001, pp. 149-206.

Brown, et al "Compiler-Based I/O Prefetching for Out-of-Core Applications", ACM Transactions on Computer Systems, vol. 19, No. 2, May 2001, pp. 111-170.

IEEE, "IEEE Standard Test Access Port and Boundary-Scan Architecture", Jul. 23, 2001, IEEE Std 1149-1-2001, pp. 11-13.

Wang, et al., "Guided Region Prefetching: A Cooperative Hardware/ Software Approach", Jun. 2003, pp. 388-398.

Seceleanu et al.; "Segment Arbiter as Action System;" IEEE Jul. 2003 pp. 249-252.

JEDEC Solid State Technology Association, "JEDEC Standard: DDR2 SDRAM Specification", Jan. 2004, JEDEC, Revision JESD79-2A, p. 10.

Natarajan, et al., "A Study of Performance Impact of Memory Controller Features in Multi-Processor Server Environment", Jun. 2004, pp. 80-87.

Sivencrona et al.; "RedCAN™: Simulations of two Fault Recovery Algorithms for CAN;" Proceedings for the 10th IEEE Pacific Rim International Symposium on Dependable Computing (PRDC'04); Mar. 3-5, 2005.

Ghoneima et al.; "Optimum Positioning of Interleaved Repeaters in Bidirectional Buses;" IEEE Transactions on Computer-Aided Design of Integrated Circuits and Systems, vol. 25, No. 3, Mar. 2005, pp. 461-469.

Penrod, Lee, "Understanding System Memory and CPU Speeds: A laymans guide to the Front Side Bus (FSB)", Dec. 28, 2005, Direction. Org, pp. 1-5, http://www.directron.com/directron/ fsbguide.html. [online]; [retrieved on Feb. 23, 2006]; retrieved from the Internet.

U.S. Appl. No. 11/419,586, filed May 22, 2006. Robert Tremaine. "Systems and Methods for Providing Remote Pre-Fetch Buffers".

Wikipedia, Serial Communications, [online], [retrieved Apr. 10, 2007 from the Internet], http://en.wikipedia.org/wiki/Serial_communications,p. 1.

Fully Buffered DIMM (FB-DIMM), XP002490174, Joe Jeddeloh, Advanced Systems Technology, Micron Technology, Inc. Apr. 16, 2008, 23 pages.

"Novel Bus Reconfiguration Scheme With Spare Lines", XP000676205, IBM Technical Disclosure Bulletin, vol. 29, No. 12, IBM Copr., NY, US, May 1, 1987, pp. 5590-5593.

"Using Dual and Mappable Spare Bus", XP000433763, IBM Technical Disclosure Bulletin, vol. 37, No. 2B, IBM Copr., NY, US, Feb. 1, 1994, pp. 59-63.

"The RAS Implications of DIMM Connector Failure Rates in Large, Highly Available Server Systems", Timothy J. Dell Ed.—Anonymous, The 53rd IEEE Holm Conference on Electrical Contacts, IEEE, PI, Sep. 1, 2007, pp. 256-261.

European Search Report, European Patent Application 05106700.7, received Aug. 11, 2008.

International Search Report, International Patent Application No. PCT/US07/75944, mailed Sep. 23, 2008, 3 pages.

European Search Report, European Patent Application No. 05106701.5, mailed Oct. 7, 2008, 5 pages.

European Search Report, European Patent Application No. 05109837.4, mailed Oct. 7, 2008, 5 pages.

PCT Search Report PCT/EP2006/068984. Mailed Feb. 9, 2007.

PCT Search Report PCT/EP2007/057915. Mailed Jul. 31, 2007.

PCT Search Report PCT/EP2007/057916. Mailed Dec. 14, 2007.

PCT Search Report PCT/EP2007/054929. Mailed Sep. 6, 2007.

Yang, Q.; Bhuyan, L.N., "Analysis of packet-switched multiple-bus multiprocessor systems," Computers, IEEE Transactions on, vol. 40, No. 3, pp. 352-357, Mar. 1991.

Li, P; Martinez, J.; Tang, J.; Priore, S.,; hubbard, K.; Jie Xue; Poh, E.; Ong MeiLin; Chok KengYin; Hallmark, C.; Mendez, D.; "Development and evaluation of a high perfoimance fine pitch SODIMM socket package." Electronic Components and Technology Conference, 2004. Proceedings. 54th, vol. 1, pp. 1161-1166, Jun. 1-4, 2004.

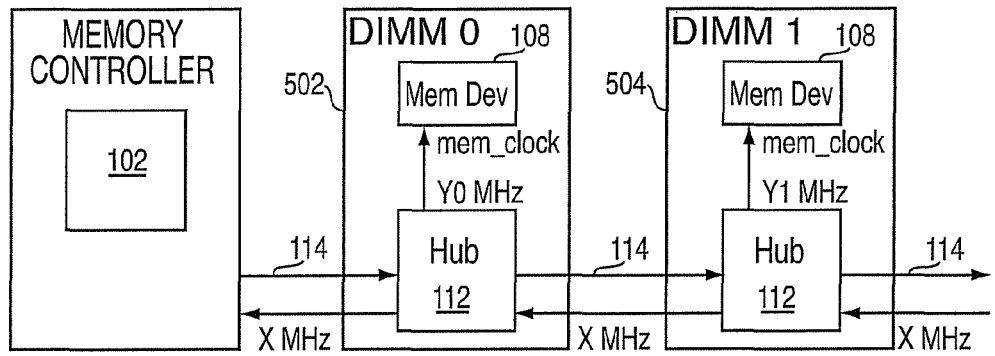
FIG. 5
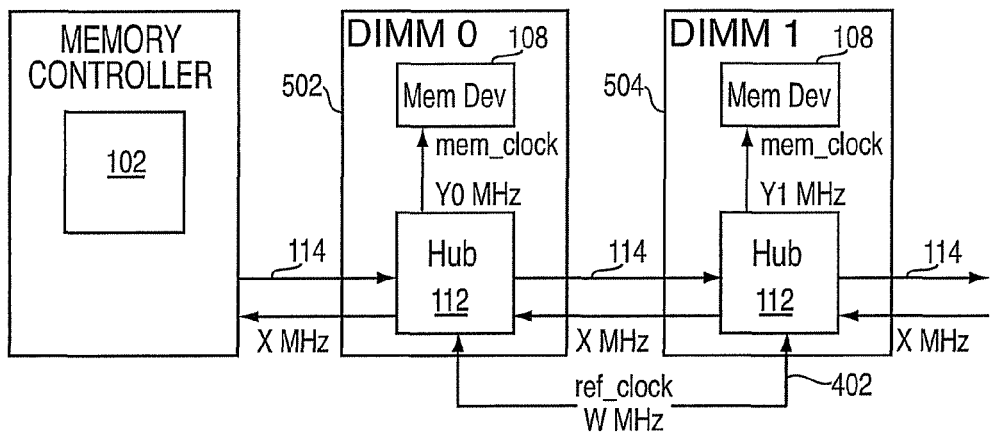
FIG. 6
| | n | 3 | 4 | 5 | 6 | 8 | 10 | 12 |
|---|---|---|---|---|---|---|---|---|
| m | 2Y<br>2X (Mbps) | 800 | 1067 | 1333 | 1600 | 2133 | 2667 | 3200 |
| 12 | 3200 | 4:1 * | 3:1 * | 12:5 | 2:1 | 3:2 | 6:5 | 1:1 |
| 14 | 3733 | 14:3 | 7:2 | 14:5 | 7:3 | 7:4 | 7:5 | 7:6 |
| 16 | 4267 | 16:3 | 4:1 * | 16:5 | 8:3 | 2:1 | 8:5 | 4:3 |
| 18 | 4800 | 6:1 * | 9:2 | 18:5 | 3:1 * | 9:4 | 9:5 | 3:2 |
| 20 | 5333 | 20:3 | 5:1 | 4:1 * | 10:3 | 5:2 | 2:1 | 5:3 |
| 22 | 5867 | 22:3 | 11:2 | 22:5 | 11:3 | 11:4 | 11:5 | 11:6 |
| 24 | 6400 | 8:1 | 6:1 * | 24:5 | 4:1 * | 3:1 * | 12:5 | 2:1 |
| 26 | 6933 | 26:3 | 13:2 | 26:5 | 13:3 | 13:4 | 13:5 | 13:6 |
| 28 | 7466 | 28:3 | 7:1 | 28:5 | 14:3 | 7:2 | 14:5 | 7:3 |
| 30 | 8000 | 10:1 | 15:2 | 6:1 * | 5:1 | 15:4 | 3:1 * | 5:2 |
| 32 | 8533 | 32:3 | 8:1 | 32:5 | 16:3 | 4:1 * | 16:5 | 8:3 |
| 34 | 9066 | 34:3 | 17:2 | 34:5 | 17:3 | 17:4 | 17:5 | 17:6 |
| 36 | 9600 | 12:1 | 9:1 | 36:5 | 6:1 * | 9:2 | 18:5 | 3:1 * |
FIG. 7

DERIVING CLOCKS IN A MEMORY SYSTEM

CROSS-REFERENCE TO RELATED APPLICATION

This application is a continuation of U.S. patent application Ser. No. 11/263,344, filed Oct. 31, 2005, the disclosure of which is incorporated by reference herein in its entirety.

BACKGROUND

This invention relates to memory systems comprised of hub devices connected to a memory controller by a daisy chained controller channel. The hub devices are attached to or reside upon memory modules that contain memory devices. More particularly, this invention relates to allowing the memory devices on the same controller channel to operate at varying frequencies.

Most high performance computing main memory systems use multiple memory modules with multiple memory devices connected to a controller by one or more controller channels. All memory modules connected to the same controller channel operate at the same controller frequency and all of their memory devices operate at the same frequency. The ratio of the controller channel frequency to the memory device clock frequency is typically a fixed integer. These restrictions limit the memory device operating frequencies when mixed within a channel. Due to the fixed ratio of channel frequency to memory device frequency, channels that are not able to attain the highest data rate will operate with a decrease in both channel and memory device frequency. These typical main memory systems must operate no faster than the slowest memory module on the channel. When a channel is populated with a memory module that is slower than the others, the entire channel, and perhaps the entire memory system, must slow down to accommodate the capabilities of the slow memory module.

The reductions in memory system operating frequency result in a corresponding reduction in computer system main memory performance. What is needed is a memory system that operates its controller channel at the highest supported rate while operating all memory devices on the memory modules at their highest supported rates. This capability would maximize the performance of the main memory system.

SUMMARY

Exemplary embodiments include a computer program product for deriving clocks in a memory system. The computer program product includes a storage medium readable by a processing circuit and storing instructions for execution by the processing circuit for facilitating a method. The method includes receiving a reference oscillator clock at a hub device. The hub device is in communication with a controller channel via a controller interface and in communication with a memory device via a memory interface. A base clock operating at a base clock frequency is derived from the reference oscillator clock. A memory interface clock is derived by multiplying the base clock by a memory multiplier. A controller interface clock is derived by multiplying the base clock by a controller multiplier. The memory interface clock is applied to the memory interface and the controller interface clock is applied to the controller interface.

Additional exemplary embodiments include a hub device in a memory system. The hub device includes a memory interface, a controller and a clock derivation mechanism. The memory interface is utilized for transmitting and receiving data from a memory device located on a memory module. The transmitting and receiving occur in response to a memory interface clock operating at a memory module clock frequency. The controller interface is utilized for transmitting and receiving data from a controller channel in response to a controller interface clock operating at a controller channel clock frequency. The clock derivation mechanism facilitates: receiving a reference oscillator clock; deriving a base clock operating at a base clock frequency from the reference oscillator clock; deriving the memory interface clock by multiplying the base clock by a memory multiplier; deriving the controller interface clock by multiplying the base clock by a controller multiplier; applying the memory interface clock to the memory interface; and applying the controller interface clock to the controller interface.

Further exemplary embodiments include a memory system. The memory system includes a controller, a controller channel in communication with the controller, one or more memory modules and one or more hub devices. The memory modules each include one or more memory devices. The hub devices buffer addresses, commands and data. Each hub device is in communication with one or more of the memory modules and in communication with the controller via the controller channel. Each of the hub devices are independently configured with a controller channel operating frequency and a memory device operating frequency suing multiples of a base clock derived from a reference oscillator clock. The controller channel operating frequency is utilized for communicating with the controller channel. The memory device operating frequency is utilized for communicating with the memory devices.

BRIEF DESCRIPTION OF THE SEVERAL VIEWS OF THE DRAWINGS

Referring now to the drawings wherein like elements are numbered alike in the several FIGURES:

FIG. 5 depicts an exemplary memory system controller channel with a controller interface forwarded reference clock and independent memory device frequencies using m:n clocking;

FIG. 6 depicts an exemplary memory system controller channel with a separately distributed reference clock and independent memory device frequencies using m:n clocking; and FIG. 7 is a table of sample controller and memory interface data rates with m:n ratios that may be implemented by exemplary embodiments.

DETAILED DESCRIPTION

Exemplary embodiments pertain to computer memory systems constructed of memory modules interconnected by a controller channel originating from a controller. The memory modules are attached to hub logic devices that are further attached to memory devices on the memory modules. The memory controller channel operates at a common clock frequency. Each memory module receives a common reference oscillator frequency, either by a forwarded controller interface bus clock on the controller channel or by separate reference oscillator input signal. The hub devices are uniquely configured to operate their attached memory devices at operating frequencies that may be non-integer multiples of the reference oscillator frequency. This enables memory modules of varying memory device speed grades to be operated at independent frequencies while residing on a memory controller channel that operates at a common clock frequency.

Figure 1:
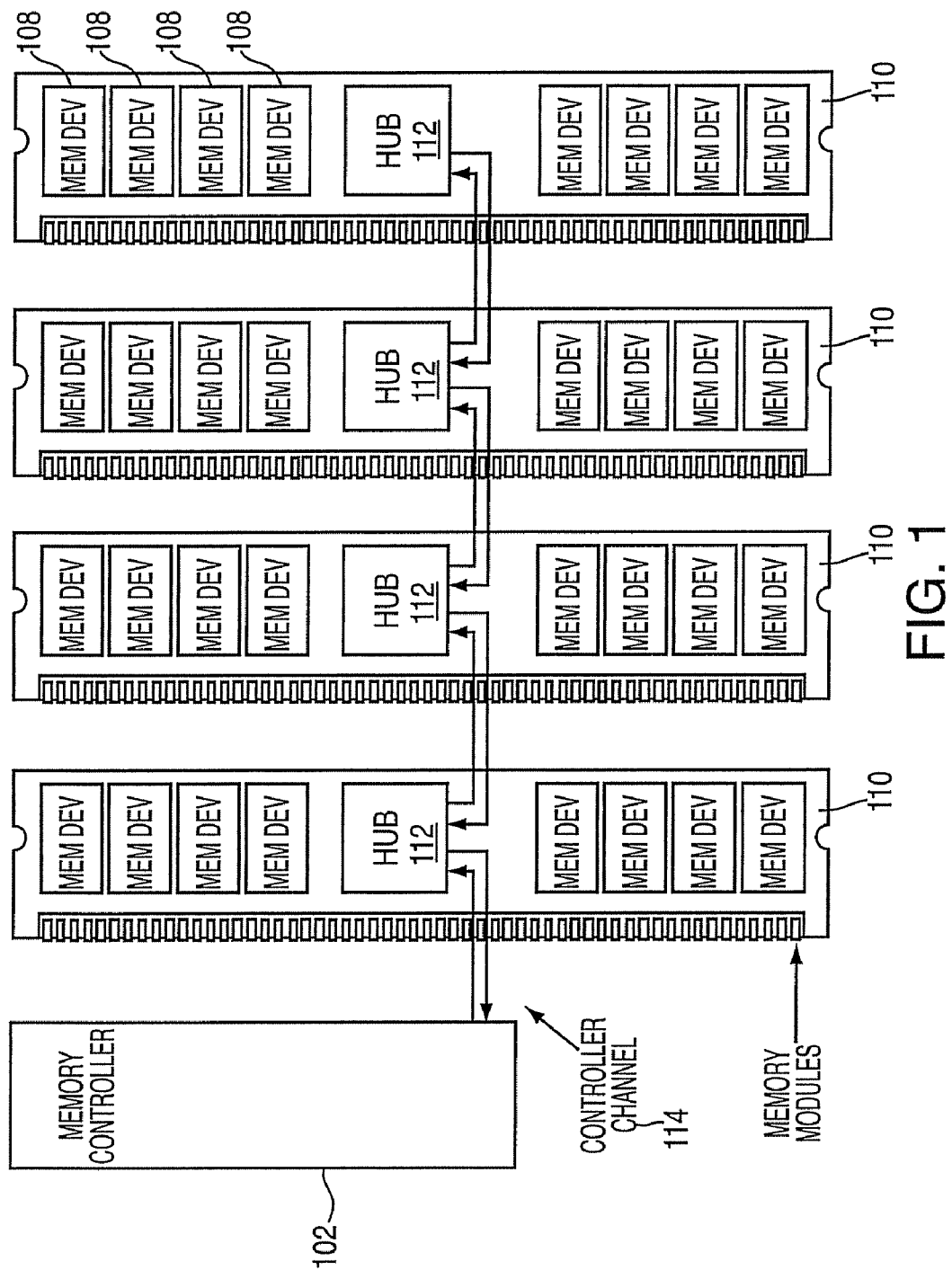
FIG. 1 depicts an exemplary memory system with multiple levels of daisy chained memory modules with point-to-point connections.

Exemplary embodiments include memory systems constructed of one or more memory modules 110 that are connected to a memory controller 102 by a daisy chained controller channel 114 as depicted in FIG. 1. The memory modules 110 contain both a hub device 112 that buffers commands, address and data signals to and from the controller memory channel 114 as well as one or more memory devices 108 connected to the hub device 112. The downstream portion of the controller channel 114 transmits write data and memory operation commands to the hub devices 112. The upstream portion of the controller channel 114 returns requested read data to the controller 102. In exemplary embodiments, each of the hub devices 112 may be independently configured with a controller channel operating frequency and a memory device operating frequency to allow the controller channel 114 to be operating at one frequency and the memory devices 108 to be operated at a different frequency. In addition, each memory module 110 in the memory system and its associated memory devices 108 may be operating at different operating speeds, or frequencies.

Figure 2:
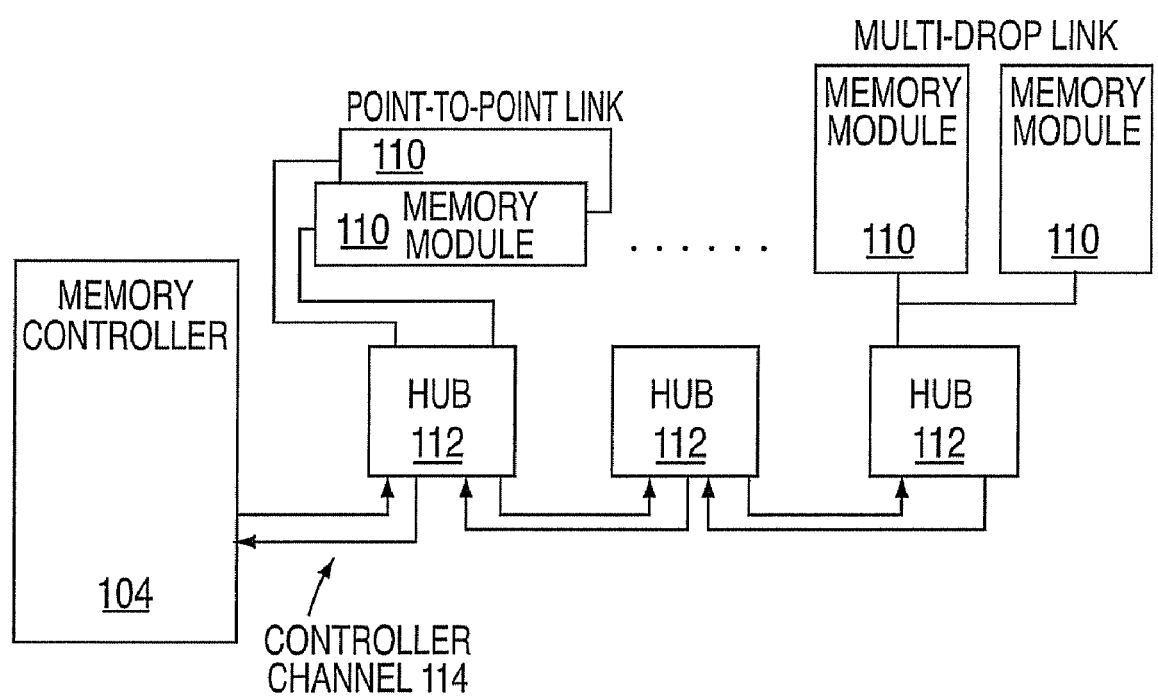
FIG. 2 depicts an exemplary memory system with hub devices that are connected to memory modules and to a controller channel by a daisy chained channel.

FIG. 2 depicts an alternate exemplary embodiment that includes a memory system constructed of one or more memory modules 110 connected to hub devices 112 that are further connected to a memory controller 102 by a daisy chained controller channel 114. In this embodiment, the hub device 112 is not located on the memory module 110; instead the hub device 112 is in communication with the memory module 110. The controller channel 114 may be constructed using multi-drop connections to the hub devices 112 or by using point-to-point connections. As depicted in FIG. 2, the memory modules 110 may be in communication with the hub devices 112 via multi-drop connections and/or point-to-point connections. Other hardware configurations are possible, for example exemplary embodiments may utilize only a single level of daisy chained hub devices 112 and/or memory modules 110.

Figure 3:
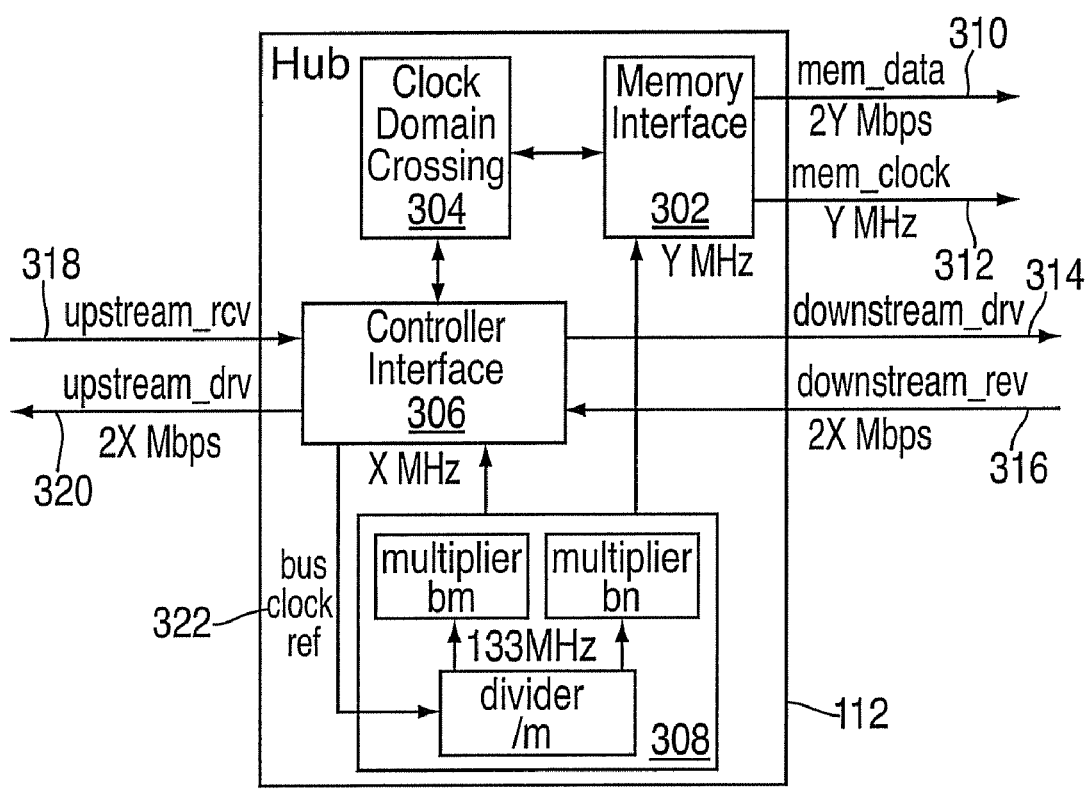
FIG. 3 depicts an exemplary hub device using m:n clocking with a forwarded controller interface bus clock reference.

FIG. 3 depicts an exemplary hub device 112 using m:n clocking with a forwarded controller interface bus clock reference 322 as the reference oscillator clock. The hub device 112 includes a clock domain crossing function 304, a memory interface 302, a controller interface 306, and a phased lock loop (PLL) 308 (also referred to herein as a clock derivation mechanism because it may be implemented in other manners including software and/or hardware). The memory interface 302 sends data to and receives data from memory devices 108 on the memory module 110 via a mem_data bus 310 operating at '2*Y' Mbps and clocked by a memory_clock 312 with a frequency of 'Y' MHz. The controller interface 306 communicates with downstream memory modules 110 via a downstream_drv 314 (to drive data and commands downstream) and a Downstream_rcv 316 (to receive data). In addition, the controller interface 306 communicates with upstream memory modules 110 or the controller 102 (if there are no upstream memory modules 110) 110 via an upstream_rcv 318 (to receive data and commands) and an upstream_drv 320 (to drive data and commands upstream).

Exemplary embodiments of the present invention use two configurable integer ratios, named 'm' and 'n', within the hub device 112 to allow each memory module 110 within the controller channel 114 to operate at a common channel frequency (also referred to herein as a controller channel clock frequency) but with a unique memory device frequency (also referred to herein as a memory module clock frequency). 'm', a controller multiplier, is defined as the ratio of controller channel frequency, 'X' to a small, fixed, base clock frequency such as, but not limited to 133 MHz, 100 MHz, 66 MHz, etc. Hub devices 112 that use the clock forwarded on the controller channel 114 as their internal reference clock will divide the frequency of the forwarded controller interface bus clock reference 322 by 'm' to create, for example, a 133 MHz base clock. If the intended controller interface frequency is not evenly divisible by the base clock frequency, then the controller interface frequency is derived by rounding down to the next integer multiple of the frequency of the base clock ('b'). This base clock will be used as the reference oscillator clock and input to a PLL 308 where it will be multiplied by 'm' to produce a cleaned up and distributed version of the controller interface clock. 'n', the memory multiplier, is defined as the ratio of the memory device clock frequency to the base frequency (e.g., 133 MHz). Hub devices 112 multiply the 133 MHz base clock by 'n' in their PLL 308 to produce the cleaned up memory interface clock running at 'Y' MHz. The resulting controller channel frequency to memory device operating frequency ratio is 'm:n'.

Because the ratio of controller interface to memory interface operating frequency is known by the hub device 112, a simplified clock domain crossing function 304 is employed in the hub device 112 to transfer controller interface information to and from the memory interface 302. If the controller interface 306 and/or memory interface 302 operate using double data rate (DDR) clocking, the data rates (in Mbps) will be twice the respective interface clock frequency, (i.e., 2X and/or 2Y). If DDR is used on both interfaces, the ratio of the data rates will also be 'm:n'.

Figure 4:
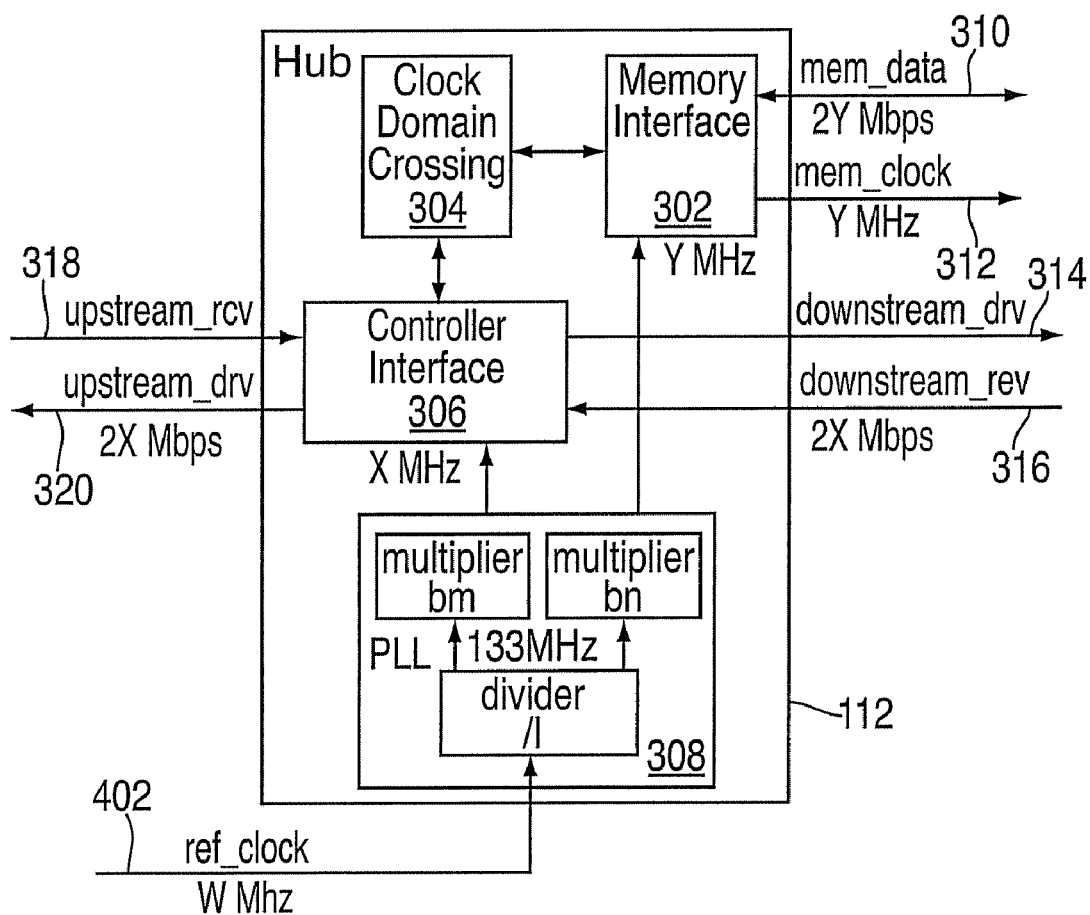
FIG. 4 depicts an exemplary hub device using m:n clocking with a separately distributed clock reference.

FIG. 4 depicts an exemplary hub device using m:n clocking with a separately distributed reference clock 402 input to the PLL 308 as the reference oscillator clock. Main memory systems that use a separately distributed reference clock 402 can also use 'm:n' clocking. In this case, the frequency of the incoming reference clock 402 must be an integer multiple of the frequency of the base clock (e.g., 133 MHz). The reference clock 402 operating at a frequency of 'W' MHz is divided by an integer 'L' to produce the 133 MHz base clock that is used as the input clock to the multipliers in the PLL 308. If the separately distributed reference clock 402 has a frequency that is equal to 133 MHz, then 'L' is simply one. The PLL 308 multiplies the base clock by 'm' to produce the cleaned up controller interface clock whose frequency is 'X'. The PLL 308 also multiplies the base clock by 'n' to produce the memory interface clock whose frequency is 'Y'. A simplified clock domain crossing function 304 is used to transfer information between the logic in the controller interface 306 and the memory interface 302.

FIG. 5 depicts an exemplary memory system controller channel 114 with a controller interface forwarded reference clock 322 and independent memory device frequencies using m:n clocking. Memory systems that use 'm:n' clocking are able to operate their memory modules 110 at uniquely configured memory interface frequencies equal to the highest frequency supported by their memory devices 108. FIG. 5 shows a single channel of a memory system in which the memory module labeled DIMM 0 502 is configured to operate its memory devices 108 at the 'Y0' frequency while the memory module labeled DIMM 1 504 is configured to operate its memory devices 108 at the 'Y1' frequency. Both DIMM 0 502 and DIMM 1 504 operate at a common, 'X' controller interface frequency. FIG. 6 depicts an exemplary memory system channel with a separately distributed reference clock 402 and independent memory device frequencies using m:n clocking to maximize frequencies and performance.

If the memory channel frequency, 'X' is limited by its electrical and/or timing requirements in a particular system, the memory device frequencies can still be maximized through the use of m:n clocking. This maximization of operating frequencies results in an optimization of memory channel, and therefore computer system, performance.

When configuring a memory system for optimum performance using m:n clocking, users should first evaluate the highest supported controller channel frequency. This is rounded down to the next integer multiple of the base clock frequency, (e.g., 133 MHz) and yields 'X'. 'X' is divided by the base clock frequency to determine 'm' for all hub devices 112 in the controller channel 114. For each memory module 110 in the controller channel 114, users should evaluate the highest supported memory device operating frequency. This will be a function of hub device 112 and memory device 108 specifications along with the results of electrical analysis of the memory interface 302 on the memory module 110 itself. This maximum operating frequency should be rounded down to the next integer multiple of the base clock frequency, yielding 'Y' for that memory module 110. 'Y' is divided by the base clock frequency to determine 'n' for that particular memory module 110 and/or hub device 112.

FIG. 7 is a table of sample controller and memory interface data rates with m:n ratios that may be implemented by exemplary embodiments. Memory systems using m:n clocking are highly flexible and can be greatly optimized. The following table shows various m and n values, data rates and m:n ratios for a base clock frequency of 133 MHz. Some interesting integer m:n ratios are highlighted with a '*' to illustrate settings that can be used to recreate the more typical, fixed data rate ratios at various controller channel and memory device operating frequencies.

Exemplary embodiments may be utilized to maximize the performance of a memory system by operating the controller channel at its highest supported rate while at the same time operating all memory devices on the memory modules at their highest supported frequencies. The frequencies of the memory devices on each memory module connected to the controller channel can be different for each memory module, allowing memory devices of varying speeds to be optimized on the same controller channel.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A computer program product for deriving clocks in a memory system, the computer program product comprising:
   a storage medium readable by a processing circuit and storing instructions for execution by the processing circuit for facilitating a method comprising:
   receiving a reference oscillator clock at a hub device, the hub device in communication with a controller channel via a controller interface and the hub device in communication with a memory device via a memory interface;
   deriving a base clock from the reference oscillator clock, the base clock operating at a base clock frequency;
   deriving a memory interface clock by multiplying the base clock by a memory multiplier;
   deriving a controller interface clock by multiplying the base clock by a controller multiplier;
   applying the memory interface clock to the memory interface; and
   applying the controller interface clock to the controller interface, wherein controller interface information is transferred via a clock domain crossing function between the controller interface operating at a controller channel clock frequency and the memory interface operating at a memory module clock frequency, and further wherein the controller channel clock frequency is greater than the memory module clock frequency.

2. A hub device in a memory system, the hub device comprising:
   a memory interface for transmitting and receiving data from a memory device located on memory module, the transmitting and receiving occurring in response to a memory interface clock operating at a memory module clock frequency;
   a controller interface for transmitting and receiving data from a controller channel in response to a controller interface clock operating at a controller channel clock frequency; and
   a clock derivation mechanism for facilitating:
      receiving a reference oscillator clock;
      deriving a base clock from the reference oscillator clock, the base clock operating at a base clock frequency;
      deriving the memory interface clock by multiplying the base clock by a memory multiplier;
      deriving the controller interface clock by multiplying the base clock by a controller multiplier;
      applying the memory interface clock to the memory interface; and applying the controller interface clock to the controller interface, wherein controller interface information is transferred via a clock domain crossing function between the controller interface operating at a controller channel clock frequency and the memory interface operating at a memory module clock frequency, and further wherein the controller channel clock frequency is greater than the memory module clock frequency.

3. The hub device of claim 2 wherein the reference oscillator clock is derived from a forwarded controller interface bus clock at the controller channel clock frequency that is an integer multiple of the base clock frequency.

4. The hub device of claim 2 wherein the base clock is derived by dividing the reference oscillator clock by the controller multiplier.

5. The hub device of claim 2 wherein the reference oscillator clock is derived from a separately distributed reference clock with a frequency that is an integer multiple of the base clock frequency.

6. The hub device of claim 5 wherein the base clock is derived by dividing the reference oscillator clock by the integer multiple.

7. The hub device of claim 2 wherein the controller channel clock frequency is a non-integer multiple of the memory module clock frequency.

8. The hub device of claim 2 wherein the memory multiplier can be different than the controller multiplier.

9. The hub device of claim 2 wherein the controller channel is a point to point memory channel.

10. The hub device of claim 2 wherein the controller channel is a multi-drop memory channel.

11. The hub device of claim 2 wherein the controller channel is a daisy chained memory channel.

12. A memory system comprising:
a controller;
a controller channel in communication with the controller;
one or more memory modules each including one or more memory devices; and
one or more hub devices for buffering addresses, commands and data, each hub device in communication with one or more of the memory modules and in communication with the controller via the controller channel, wherein each of the hub devices are independently configured with a controller channel operating frequency and a memory device operating frequency using multiples of a base clock derived from a reference oscillator clock, the controller channel operating frequency utilized for communicating with the controller channel and the memory device operating frequency utilized for communicating with the memory devices.

13. The memory system of claim 12 wherein the reference oscillator clock is derived from a forwarded controller interface bus clock.

14. The memory system of claim 12 wherein the reference oscillator clock is derived from a separately distributed reference clock.

15. The memory system of claim 12 wherein the memory channel is point to point.

16. The memory system of claim 12 wherein the memory channel is multi-drop.

17. The memory system of claim 12 wherein the memory channel is daisy chain.

18. The memory system of claim 12 wherein the hub devices are located on the memory modules.

* * * * *